NOISE REDUCTION CIRCUIT FOR A BINARY SIGNAL DISCRIMINATOR

Filed Jan. 22, 1963 3 Sheets-Sheet 1

INVENTORS: R. M. GENKE
P. A. HARDING
BY
Charles Scott Phelan
ATTORNEY

NOISE REDUCTION CIRCUIT FOR A BINARY SIGNAL DISCRIMINATOR

Filed Jan. 22, 1963 3 Sheets-Sheet 2

NOISE REDUCTION CIRCUIT FOR A BINARY SIGNAL DISCRIMINATOR

Filed Jan. 22, 1963 3 Sheets-Sheet 3

United States Patent Office 3,308,388

Patented Mar. 7, 1967

3,308,388

NOISE REDUCTION CIRCUIT FOR A BINARY SIGNAL DISCRIMINATOR

Richard M. Genke, Colts Neck, and Philip A. Harding, Middletown, N.J., assignors to Bell Telephone Laboratories, Incorporated, New York, N.Y., a corporation of New York Filed Jan. 22, 1963, Ser. No. 253,227
11 Claims. (Cl. 328—164)

This invention relates to a noise reduction circuit for a binary signal amplitude discrimintaor.

In binary signaling circuits, such as the output sensing circuit of a magnetic memory, it is conventional practice to discriminate between circuit voltage signals representing binary ONE and ZERO information bits by means of a signal amplitude sensitive circuit. The ONE signal, for example, is advantageously assigned the larger amplitude, and the amplitude sensitive discriminator indicates whether or not such amplitude is present. The ZERO signal is considered to be noise because it has a finite magnitude that must be rejected by the amplitude discriminating circuits in order to decide whether a particular signal is a binary ONE signal or a binary ZERO signal.

Heretofore binary ONE-ZERO discriminator circuits have been strobed in a narrow time slot which is a small fraction of the total information signal bit interval. The strobe time is phased in a magnetic memory system to occur at a time when a binary ONE signal should have maximum amplitude and a binary ZERO signal should have passed its peak amplitude and be starting to decrease in amplitude. However, because of many factors such as other noises in the memory sensing circuit and delay and attenuation in the sensing circuit, there are times when the signal-to-noise ratio is quite low, and it is difficult to distinguish a binary ONE signal from a binary ZERO signal.

It is, therefore, one object of the present invention to increase the operating margin of binary signal amplitude discriminators.

It is another object to improve the signal-to-noise ratio at the input to a strobed signal amplitude discriminator circuit.

Another object is to reduce the effects of noise caused by binary ZERO read-out signals in a magnetic memory sensing circuit.

These and other objects of the invention are realized in an illustrative embodiment in which there is added to a strobed amplitude discriminating circuit apparatus for altering the input circuit time constant at preselected times during each signal interval to attenuate noise to a much greater extent than the desired signals.

In one form the apparatus includes a resistor, a capacitor, and a normally-conducting clamp circuit which are connected in series across input connections for receiving pulse signals. The input of an amplitude discriminator is connected across the clamp circuit. At a predetermined time $t_1$ after the beginning of each input signal interval, a control signal is applied to disable the clamp so that the resistor and capacitor are then connected in series with the input resistance of the discriminator. At a later time $t_2$ the discriminator is strobed to sample the input signal coupled thereto via the resistor and capacitor. The resistor-capacitor time constant is chosen so that the charge accumulated on the capacitor at the time $t_1$ is approximately equal to the anticipated ZERO signal, i.e., noise, amplitude at the time $t_2$ so that such charge tends to cancel the noise from the signal sample. It is a feature of this apparatus arrangement that the ZERO noise is reduced to such a low level that there is a large increase in signal-to-noise ratio at time $t_2$.

It is one feature of the invention that structures utilized therein have symmetrical signal conduction characteristics so that the invention operates with equal facility to produce the beneficial noise reduction results for either bipolar or unipolar signals.

It is another feature that a high-input-resistance amplitude detecting circuit is combined with a clampable input coupling network of low time constant to form a discriminator circuit having at the input thereof a controllable time constant. Such controllable time constant is advantageously employed to attenuate noise at times when such attenuation will not hamper the signal.

Still another feature of the invention is that the mentioned resistor-capacitor time constant circuit is combined with a preamplifier for supplying input signals to an amplitude detector and the preamplifier is designed to have an output resistance which is much lower than the resistance of such resistor so that variations in the gain of the preamplifier have no substantial effect upon the time constant of the time constant circuit.

A further feature is that bipolar signals are received, level corrected, level detected, and utilized to actuate a circuit for indicating whether or not the signal represented a binary ONE; but no asymmetrically conducting circuit elements are included in the through signal path for performing such functions.

An additional feature is an impedance-gated oscillator which is utilized to indicate whether or not a signal pulse of either polarity represents a binary ONE information bit.

It is another and related feature that the use of variable time constant input circuits to achieve noise cancellation in the manner described renders the discriminator signal-to-noise ratio substantially independent of gain variations in circuits supplying input signals thereto.

A more complete understanding of the invention, and the various features, objects, and advantages thereof, may be obtained from a consideration of the following detailed description, and the appended claims, when considered in connection with the attached drawing in which:

Figure 1:
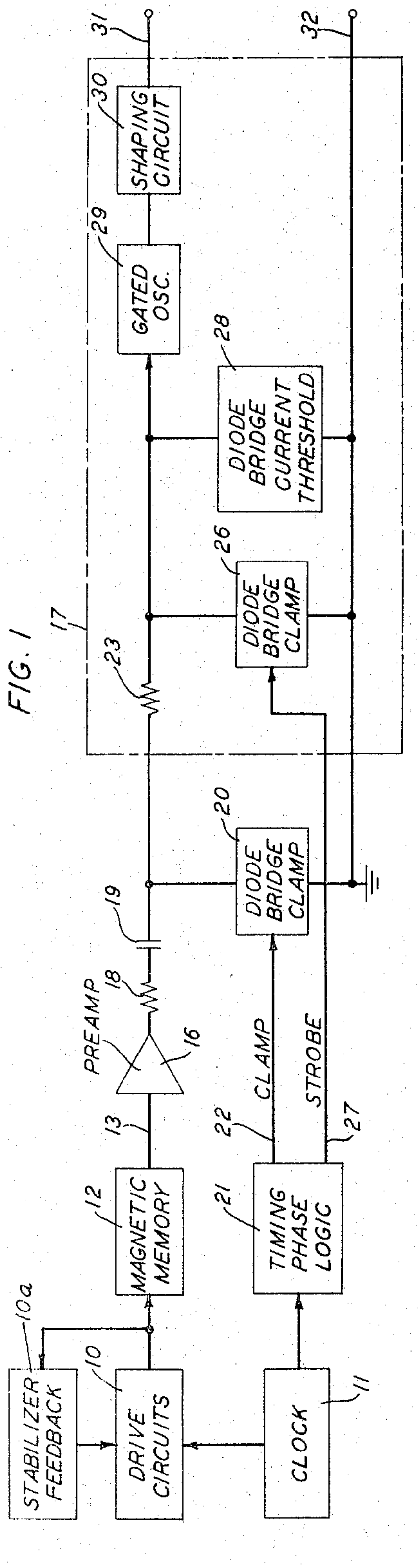
FIG. 1 is a block and line diagram of a magnetic memory system utilizing the present invention.

In FIG. 1, drive circuits 10 operate under the control of signals from a clock signal source 11 to supply drive signals to a magnetic memory 12 for reading out and writing back bits of binary coded information. Drive circuits with stabilizing feedback 10*a* for fixing drive pulse magnitude and rise time are advantageously employed for the drive circuits 10, and circuits of this sort are shown in the copending application of P. A. Harding, Serial No. 246,505, filed December 21, 1962. One memory system, including access circuits, of the type advantageously employed for memory 12 is shown for example, in the C. G. Corbella, P. A. Harding and E. H. Siegel, Jr., United States Patent 3,205,481, and includes a matrix array of bistable magnetic devices formed by apertured ferrite sheets. A sensing circuit 13 has induced therein voltage signals resulting from flux switching operations in one or more of the bistable magnetic devices in memory 12 as is well known in the art. Each signal occupies a time interval of predetermined duration and has either a large or a small amplitude to represent a binary ONE or a binary ZERO. Sensing circuit 13 supplies such signals to the input of a sensing preamplifier 16 and a coupling circuit which is advantageously employed for this purpose is shown in the copending application of P. A. Harding and E. H. Siegel, Jr., Serial No. 250,559, filed Jan. 10, 1963, and which is entitled, "Electric Circuit Equalization Means." If the memory 12 is a word-oriented memory, there would, of course, be a plurality of sensing circuits driving a corresponding plurality of preamplifiers, and such are included in the schematic representation of circuit 13 and preamplifier 16.

In accordance with the present invention, the output of preamplifier 16 is coupled to the input of an amplitude discriminating circuit. This latter circuit includes a strobed amplitude discriminator 17 that is connected by means of a series-connected resistor 18 and capacitor 19 to preamplifier 16. A clamp circuit 20 is connected across the input to discriminator 17 and is normally conducting so that output signals from preamplifier 16 are conducted through resistor 18 and capacitor 19 and are thereafter shunted to ground by clamp circuit 20. Thus, the discriminator 17 sees across its input circuit only the very low impedance of the actuated clamp circuit.

A timing phase logic circuit 21 is controlled by another output from clock source 11 to produce various timing phase signals used in the memory system. One such signal is a clamp control signal which is applied by circuit 22 to disable the clamp circuit 20. This clamp disabling signal is produced by the logic circuit 21 at a predetermined time after the beginning of each signal bit interval. Accordingly, a charge voltage is accumulated prior to that time on capacitor 19, and this charge has a magnitude which is dependent upon the time constant of resistor 18, capacitor 19, clamp 20, and the output resistance of preamplifier 16. It will be subsequently shown in connection with FIG. 3 that the output resistance of preamplifier 16 and the resistance of clamp circuit 20 are so small with respect to the resistance of resistor 18 that they may for practical purposes be neglected when determining the circuit time constant.

Figure 2A:
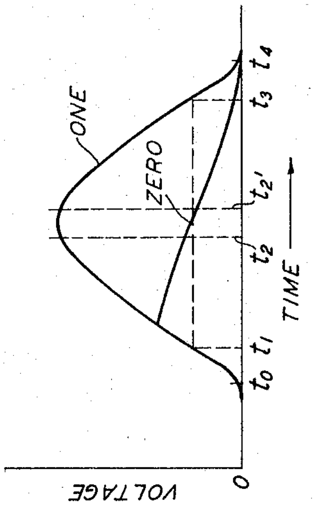
FIGS. 2A and 2B are voltage wave diagrams illustrating the operation of the invention.

In FIG. 2A, which is a voltage-versus-time diagram of a signal bit interval at the output of preamplifier 16, a typical ONE and a typical ZERO signal are superimposed for convenience in illustrating the operation of the invention, although in actual circuit operation they would occur in separate bit intervals. The waves of FIG. 2A also represent the signals that would be applied to the input of an amplitude discriminator of the prior art. It may be observed in FIG. 2A that during the initial portion of the bit interval the ONE and ZERO signals have substantially the same configuration and that during a subsequent portion of the bit interval these signals have divergent configurations. In the third and final portion of the bit interval the signals converge. In a magnetic memory system, the output signals, such as those illustrated in FIG. 2A, are normally sampled for amplitude discriminating purposes at a time $t_2$ when the ONE is at substantially maximum magnitude. At that time the ONE and ZERO signal configurations are generally still divergent so that the maximum amplitude difference therebetween prevails.

In accordance with the present invention, timing phase logic circuit 21 is adapted in cooperation with the time constant of resistor 18 and capacitor 19 so that there is accumulated on capacitor 19 at time $t_1$ a charge which is approximately equal in magnitude to the anticipated ZERO signal magnitude at time $t_2$ for a given ZERO signal shape. The latter shape is a function of the drive pulse shape from driver circuits 10. Thus, in the illustrated example the time constant of resistor 18 and capacitor 19 has a relatively low value compared to the duration of a typical signal bit interval in the output of preamplifier 16, and the charge across capacitor 19 follows this signal closely as long as clamp circuit 20 is operative. At time $t_1$ the disabling signal from logic circuit 21 appears and opens clamp 20 so that the only discharge path remaining for capacitor 19 is through the input to discriminator 17. In some systems the time $t_1$ is advantageously shifted toward the ZERO signal peak, but in those situations the aforementioned time constant is increased so that the charge on capacitor 19 at time $t_2$ is still the same as is shown in FIG. 2A.

A series-connected resistor 23 in the input of discriminator 17 is assigned a resistance value which is much higher than the resistance of resistor 18. Consequently, the time constant for the discharge path for capacitor 19 through discriminator 17 is relatively high and the charge voltage appearing across capacitor 19 remains substantially uniform as long as clamp 20 is disabled during a single bit interval. Discriminator 17 is normally disabled by a second clamp circuit 26 which is normally operative in the absence of a strobe pulse that may be applied thereto from timing phase logic circuit 21 by a circuit 27. The strobe pulse is applied at time $t_2$ in FIG. 2A and is removed at the time $t_2'$. During the short interval between $t_2$ and $t_2'$ clamp 26 is disabled, and the discriminator circuit becomes operative to see the output of preamplifier 16 as reduced by the charge voltage on capacitor 19 which is now arranged in series bucking relationship thereto. A shunt-connected threshold circuit 28 establishes the minimum signal level which must be exceeded in order to cause discriminator 17 to indicate the reception of a binary ONE signal. Details of this threshold circuit as well as the details of the previously mentioned clamps, preamplifier 16, and the details of the remaining portions of discriminator 17 will be discussed in connection with FIGS. 3 and 4.

If the threshold voltage level fixed by circuit 28 is exceeded by an input signal during the time interval between times $t_2$ and $t_2'$, a gated oscillator 29 is triggered. The resulting output pulse from oscillator 29 is coupled through a shaping circuit 30 to the output terminals 31 and 32 of discriminator 17. If the threshold is not exceeded oscillator 29 remains in its quiescent state, and no output appears on terminals 31 and 32. At time $t_3$ the disabling signal on clamp circuit 20 is removed to reestablish the shunt across the input to discriminator 17 and restore the circuit of FIG. 1 to its initial condition.

Although the signal pulses shown in FIG. 2A are positive with respect to ground, the circuit of FIG. 1 operates with equal facility in response to negative signals also. This capability arises from the use of diode-bridge type clamp and threshold circuits and a particular type of gated oscillator circuit, all of which are responsive to bipolar signals as will subsequently be described in greater detail. Of considerable importance also is the fact that the use of these circuits eliminates the need for rectification of the bipolar signals in the signal path before amplitude detection has been completed.

Figure 2B:
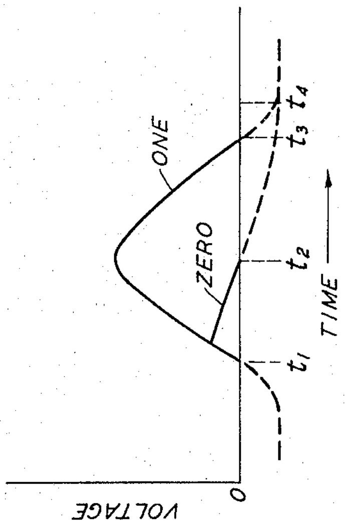

FIG. 2B is a voltage-versus-time diagram illustrating the voltage signals which appear at the input to discriminator 17 for binary ONE and ZERO signals, respectively, in terms of the system operation which was just described. The potential drop across clamp 20 before time $t_1$ and after time $t_3$ is so small that it does not appear in this diagram. Broken-line extensions of the curves indicate the configuration similarity to the curves of FIG. 2A. It will be observed in FIG. 2B that both the binary ONE and the binary ZERO signals are reduced in amplitude to the extent of the charge voltage stored on capacitor 19 at the time $t_1$ when clamp 20 is disabled. One other factor of importance is also different. The ZERO signal magnitude at time $t_2$ is now essentially zero. Since the ZERO signal is considered to be noise, the signal-to-noise ratio in FIG. 2B is very much higher than the signal-to-noise ratio of FIG. 2A wherein the binary ZERO signal had a significant amplitude at time $t_2$ compared to the amplitude of the binary ONE signal. Accordingly, there is a substantial increase in signal-to-noise ratio for circuits utilizing the present invention.

The principal frequency component of the ONE is the fundamental frequency represented by the reciprocal of the illustrated bit interval, and the fundamental has zero-axis crossings at times $t_0$ and $t_4$ with a maximum at about time $t_2$. However, since the ZERO has its maximum early in the bit interval, its principal frequency components are the second and higher harmonics of the fundamental. The second harmonic has zero-axis crossings at times $t_0$ and $t_4$, but it also has one at about time $t_2$ midway in the bit interval. Thus, sampling at time $t_2$ favors ONE signals as compared to ZERO signals. However, the noise at time $t_2$ is nevertheless formidable as can be seen in FIG. 2A wherein the signal-to-noise ratio at time $t_2$ is only about four. The present invention is uniquely adapted to increase that ratio substantially.

The noise cancellation aspect of the invention has an additional beneficial characteristic. The ZERO noise amplitudes at times $t_1$ and $t_2$ are related. If the gain of preamplifier 16 should change with aging, ambient temperature, or some other factor, the ZERO voltage output thereof would increase or decrease accordingly. However, the ZERO voltage change would produce approximately equal effects in the waveform at times $t_1$ and $t_2$ in FIG. 2A; and the quality of the aforementioned noise cancellation would not, therefore, be affected.

If systems in which the present invention is employed are subject to signal phase jitter with respect to clock signals at the output of preamplifier 16, some stabilization measures may advantageously be adopted to gain the full benefits of the present invention. In magnetic memory systems using apertured ferrite sheets, for example, sensing circuit equalizing coupling, as in the aforementioned Harding-Siegel, Jr., application, is advantageously employed to minimize differential phase delay in the sensing circuit from different locations in memory 12. In addition, the stabilized current driver of the mentioned Harding application is advantageously employed to minimize read-out phase jitter resulting from variations in current drive pulse magnitude and rise time.

Figure 5:
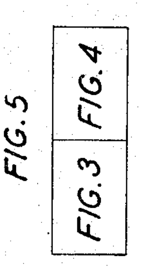
Figure 3:
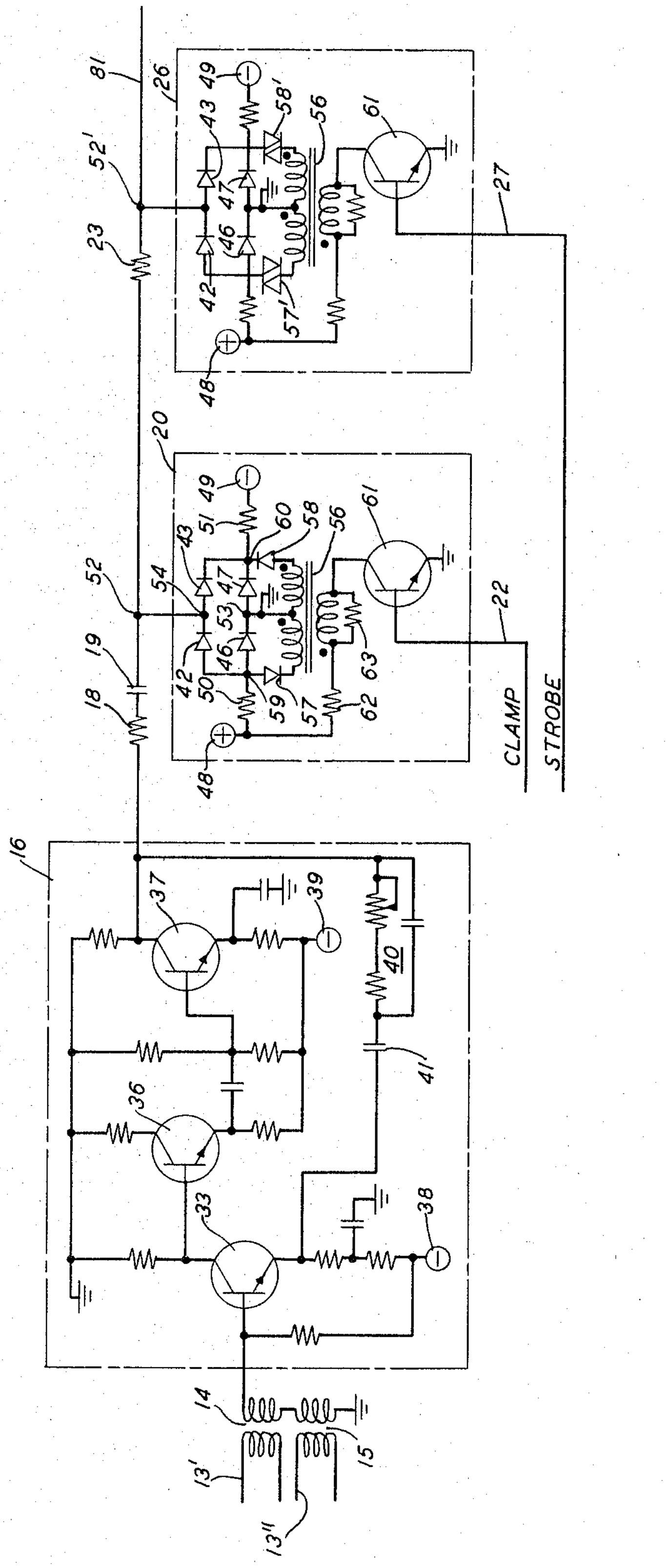
FIGS. 3 and 4, when combined in the manner indicated in FIG. 5, comprise together a composite schematic diagram of portions of the system of FIG. 1 which are of particular interest in regard to the present invention.
Figure 4:
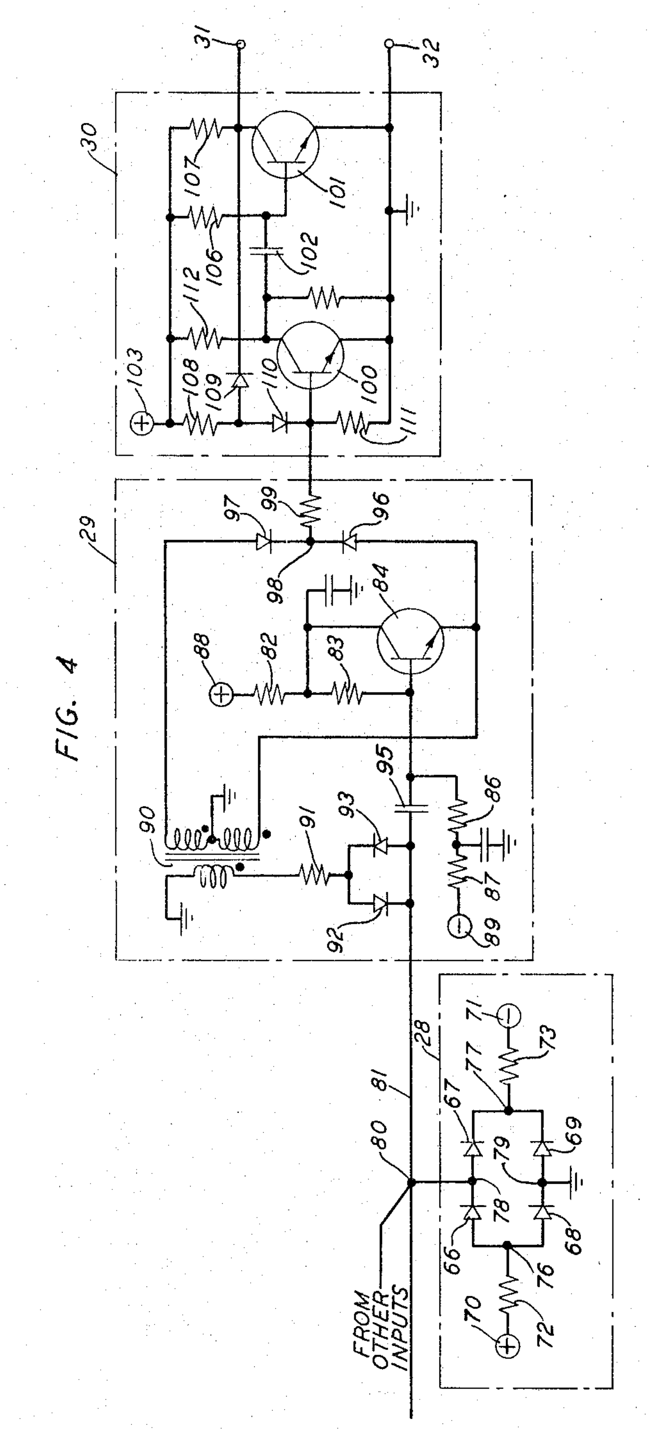

Details of the circuits including preamplifier 16 in FIG. 1, and each of the block circuits to the right thereof in that figure, are shown in FIGS. 3 and 4. The latter two figures should be placed side by side in the manner illustrated in FIG. 5. Preamplifier 16 receives output signals from magnetic memory 12 on sensing circuit 13. That circuit includes sensing circuit portions 13' and 13'' connected to the primary windings of two transformers 14 and 15 in the manner taught in the aforementioned Harding-Siegel, Jr., application. These signals may be either positive or negative. The bipolar character of the signals arises from the fact that the sensing circuit 13 has different polarity relationships with respect to drive circuits in the memory 12 in a manner that is well known in the art.

Amplifier 16 includes three transistors 33, 36, and 37 arranged in tandem amplifier stages, to provide the amount of gain suitable for operating the discriminator 17 and its associated input circuits. Each of the three transistors operates in a class A fashion under normal operating conditions. The secondary windings of transformers 14 and 15 are connected in series to apply the bipolar input signals to the base-electrode of transistor 33 which is connected in the common emitter configuration. Transistor 33 receives operating potential from a source 38 of negative potential that is schematically represented by a circled minus sign to indicate a circuit connection to the negative terminal of an appropriate source of direct potential with the opposite terminal of the source being connected to ground. Other potential sources in the circuit of FIGS. 3 and 4 are schematically represented in a similar manner with the polarity sign within the circle indicating the polarity of the potential source.

Signals at the collector electrode of transistor 33 are directly coupled to the base electrode of a transistor 36 which is connected as an emitter-follower circuit. Output signal is derived from the emitter circuit of transistor 36 and capacitively coupled to the base electrode of transistor 37. Transistors 36 and 37 receive operating potential from a negative source 39. A negative feedback circuit is provided to connect the collector electrode of transistor 37 back to the emitter electrode of transistor 33. This feedback circuit includes a conventional feedback shaping network 40 and a coupling capacitor 41.

Output signals are coupled from the collector electrode of transistor 37 to the resistor 18 in the time constant circuit which includes that resistor and the capacitor 19. The output resistance of preamplifier 16 is quite low in view of the fact that this is a negative feedback amplifier. In a typical case this output resistance for the preamplifier 16 runs at a level of approximately 10 ohms. This magnitude of resistance is so small compared to the magnitude of resistor 18 that it may be neglected in considering the time constants involved in the circuits following preamplifier 16.

Clamp circuit 20 in FIG. 3 is a diode bridge type of clamp circuit which includes the diodes 42, 43, 46, and 47 connected in a bridge configuration to be normally biased for conduction by potential supplied by a positive source 48 and a negative source 49 through two resistors 50 and 51 to the diagonal terminals 59 and 60 of the bridge. The common junction 54 between diodes 42 and 43 is one of the clamping terminals and is connected to a circuit terminal 52 which is between capacitor 19 and resistor 23. The bridge terminal 53, which is diagonally opposite from the aforementioned bridge terminal 54, is connected to ground. The sources 48 and 49 are adapted to bias the diode bridge so that signals at terminal 25 can modulate diode current but cannot interrupt diode conduction.

ON-OFF control of the clamp circuit is exercised by means of a transformer 56 which has a primary winding and which has two secondary windings that are connected in series with one another. The common junction between the two secondary windings is connected to ground and the end terminals of the series connection are respectively connected through two diodes 57 and 58 to the bridge diagonal terminals 59 and 60. Source 48 supplies operating current to a transistor 61 through a resistor 62 and the primary winding of transformer 56. The latter primary winding is shunted by a resistor 63. The emitter electrode of transistor 61 is grounded. Clamp control signals on lead 22 are coupled directly to the base electrode of transistor 61.

In the absence of clamp control signals, transistor 61 is normally nonconducting so that the secondary windings of transformer 56 do not affect the operation of the bridge-connected diodes previously described. Under these conditions all of those diodes 42, 43, 46, and 47 are conducting. Consequently, the circuit terminal 52 is at the same potential as the bridge terminal 53, namely, ground. In this condition, the resistor 18 and capacitor 19 are connected in series with clamp 20 across the output of preamplifier 16. This series connection includes the output impedance of preamplifier 16, ground, bridge diodes 42, 43, 46, and 47, junction 54, junction 52, capacitor 19, and resistor 18.

Since the diode bridge circuit in clamp 20 places terminal 52 at ground potential, because bridge diodes 42, 43, 46, and 47 are conducting, the resistive effect of resistors 50 and 51 does not appear in the time constant of the loop circuit just described. Consequently, the only resistance appearing therein is the resistance from circuit terminal 52 to ground through the series-parallel combination of the forward conducting bridge diodes. Also, the output resistance of preamplifier 16 is not primarily the resistances of the emitter and collector circuit resistors of transistor 37 since the preamplifier has a negative feedback circuit as previously described. The output impedance of such a feedback amplifier is very low as is well known. In other words, the only significant resistance in this loop circuit is the resistance of resistor 18. Thus, resistor 18 and capacitor 19 determine the time constant of the circuit loop through clamp 20. This time constant is selected so that the charge voltage on capacitor 19 tends to follow clearly the output voltage from preamplifier 16.

At time $t_1$ the clamp disabling signal appears on circuit lead 22 as a positive pulse and forward biases the base-emitter junction of transistor 61 thereby driving this transistor into conduction. Current flowing in the collector-emitter circuit of transistor 61 develops across the primary winding of transformer 56 a potential difference which makes the dot end of that winding positive with respect to the other end thereof. This causes the dot ends of the secondary windings to be positive with respect to the undotted terminals thereof. Consequently, diodes 57 and 58 are forward biased to make bridge diagonal terminal 59 negative with respect to bridge diagonal terminal 60 and reversely bias the diodes 42, 43, 46, and 47. This action permits circuit terminal 52 to move in potential along with signals coupled thereto via resistor 18 and capacitor 19. Consequently, the output of preamplifier 16 now drives into a circuit which includes resistor 18, capacitor 19, and the input resistance of discriminator 17. The latter resistance is represented primarily by a resistor 23 which is very much larger than resistor 18. Accordingly, the time constant of the only remaining discharge path for capacitor 19 is quite high. In fact, this time constant is so high that substantially no charge is removed from capacitor 19 during the time interval $t_1$ through $t_2$.

The strobed clamp circuit 26 in discriminator 17 is of essentially the same type as the clamp 20 which has been previously described and strobed clamp 26 is likewise normally conducting so that the circuit terminal 52′ associated therewith is clamped to ground potential. The essential difference between the clamps 20 and 26 is that the diodes 57 and 58 of clamp 20 have been replaced in clamp 26 by varistors 57′ and 58′.

The varistors are essentially symmetrical in their conducting characteristics and are utilized to facilitate fast restoration of the clamp for a purpose which will be evident as the following description of the rest of the discriminator develops. The clamp is removed by the application of a positive-going strobe signal on circuit 27 to the base electrode of transistor 61 therein. This signal is applied at time $t_2$ and is removed at time $t_2'$. Upon the removal of the strobe signal, the transistor 61 in clamp 26 is biased nonconducting, and the current in its collector-emitter circuit starts to decrease. In clamp 26 the decreasing current develops a potential difference across the primary winding of transformer 56 with a polarity which makes the dotted terminal of that winding negative with respect to the other terminal thereof. A similar potential reversal takes place across the transformer secondary windings with the result that a current is driven through the bridge diodes in a loop including varistors 57′ and 58′. This current supplements the currents applied by sources 48 and 49 to cause the bridge diodes in this case to return to their conducting condition exceedingly fast. The speed of the restoration of conducting condition is the item which is important here with respect to the particular discriminator circuit utilized in the present illustrative embodiment of the invention. The tme required to restore the bridge diodes to conduction in this manner is less than the time for clamp 20 and it is not necessary to increase the sizes of sources 48 and 49 to accomplish the faster restoration.

Clamp circuits such as the circuits 20 and 26 have a number of advantages which are particularly useful in connection with the present invention. These circuits are bipolar in nature and can, therefore, accommodate bipolar signals or unipolar signals with equal facility. Furthermore, the clamp circuits, when they are open, have a relatively low capacity to ground compared to the capacity of transistor clamp circuits. The diode bridge arrangement has a resistance of approximately 10 ohms, i.e., the resistance of two bridge diodes. Consequently, this resistance has negligible effect upon the time constant of the loop circuit including preamplifier 16 when the clamp circuit is on.

Since the clamp circuits are controlled by balanced transformer windings, they add to the over-all circuit a minimum amount of unclamping noise. Also, because of the balanced nature of these clamp circuits, the resistors and potential sources used therein need not be of equal magnitudes. Signal levels in the clamped circuit can be as high as the reverse breakdown voltage of the diodes permits. The clamp circuits are also characterized by automatic temperature compensation because the changes resutling from temperature variations in the diodes are balanced out by the bridge circuit arrangement. Another feature of these clamp circuits is that additional pairs of diodes 42 and 43 can be connected to the bridge terminals 59 and 60 to supply clamping functions to a plurality of additional circuit points without the necessity for adding additional potential sources, transformers, and control transistors.

The current threshold circuit 28, which is illustrated in detail in FIG. 4, also includes a diode bridge circuit comprising the diodes 66, 67, 68, and 69. Two potential sources 70 and 71 supply operating current to this diode bridge through a pair of resistors 72 and 73 and through two bridge diagonal terminals 76 an 77. The remaining bridge diagonal terminals 78 and 79 are connected to a circuit junction 80 and to ground, respectively. The circuit junction 80 is included in a lead 81, between resistor 23 and the input of the gated oscilaltor circuit 29.

The diodes in the bridge circuit of threshold circuit 28 are normally conducting, and they cause circuit terminal 80 to be clamped to ground potential in much the same manner as the diode bridges of clamps 20 and 26. However, a signal applied to lead 81 from the preamplifier 16 can, if it is of sufficient amplitude, require a current handling capacity that is beyond the capabilities of one of the sources 70 or 71. Such a signal causes the voltage at circuit terminal 80 to depart from the ground threshold established by circuit 28. Thus, if a positive signal is applied to lead 81, and the signal is of sufficient magnitude to supply more current through diode 67 and resistor 73 than the source 71 can absorb, the circuit terminal 80 rises above the threshold and thereafter follows the configuration of the input signal. In like manner, a negative-going input signal on lead 81 must be of sufficient magnitude to absorb more current than can be supplied from the source 70 through resistor 72 and diode 66. Under either of these conditions, one of the bridge diagonal terminals 76 or 77 is changed in potential by a sufficient amount to reversely bias one of the diodes 68 or 69 and thereby open the bridge and remove the threshold circuit 28 from operation.

An advantage of this type of threshold circuit is that the input signal must exceed in current handling capacity the current capacity of one of the threshold sources before threshold effect can be overcome and an additional signal developed at the circuit terminal 80. Furthermore, the threshold requires no transistor junctions with their well known high junction capacities to be included in the threshold circuit. Also the threshold sources 70 and 71 may be set at values which are as large as may be required in order to swamp out temperaure variations and diode unbalance in the diode bridge. This type of arrangement also requires no signal rectification in the actual signal path for handling bipolar signals.

If a signal is applied to lead 81, which is of sufficient magnitude to overcome the threshold effect of the circuit 28 at the time when the clamp circuit 26 and the clamp circuit 20 are both disabled, this signal, whether positive or negative, is applied to actuate the gated oscillator 29. Any signal which does have sufficient amplitude under those conditions to overcome the threshold effect and to trigger the gated oscillator 29 is considered to be a binary ONE read-out signal from the memory 12.

Oscillator 29 includes a transistor 84 that is normally biased for conduction by the potential dividing action of four resistors 82, 83, 86, and 87 which are connected in series between a positive potential source 88 and a negative source 89. This conduction point for transistor 84 is advantageously set about midway between the cut-off and saturation conditions thereof. The common junction between resistors 83 and 86 is connected to the base electrode of transistor 84. The emitter electrode of that transistor is connected to ground through one secondary winding of a transformer 90 which has the primary winding thereof connected between ground and a resistor 91. The remaining terminal of resistor 91 is connected to lead 81 through a pair of oppositely poled diodes 92 and 93. Those diodes are advantageously employed to make the primary winding circuit responsive to either positive or negative input signals on lead 81, but they are not essential to oscillator operation in that fashion. A capacitor 95 couples input lead 81 to the base electrode of transistor 84.

The nature of the gated oscillator circuit 29 is such that it is responsive to changes in impedance coupled to the input lead 81. Thus, in the normal quiescent condition there is a relatively low input impedance in the feedback path portion between lead 81 and ground through the diode bridge of threshold circuit 28 and through the diode bridge of the strobed clamp circuit 26. In this condition, the oscillator 29 is stable. However, if the strobed clamp circuit 26 is disabled, and the threshold effect of the circuit 28 is overcome, those low impedance connections to ground are removed from the oscillator circuit; and the remaining, higher, impedance to ground from lead 81 must be found through the resistor 23 and the electrical circuitry which precedes that resistor. This change in the impedance at the input of the oscillator increases the impedance in the oscillator feedback loop and throws the circuit into an unstable oscillatory condition. However, the nature of the circuit is such that oscillations begin with a polarity which corresponds to the polarity of the input signal on lead 81. Full wave rectification of the oscillator output is provided by means of a pair of diodes 96 and 97, which are connected in series with an additional secondary winding of transformer 90 between the emitter electrode of transistor 84 and ground. The circuit terminal 98 which is common to the cathodes of diodes 97 and 96 is an output terminal for the gated oscillator 29 and is connected through a resistor 99 to the input of the shaping circuit 30.

The discriminator sampling time is selected to be less than the cyclic period of operation for the gated oscillator 29 when it is in its unstable operating condition. Accordingly, at the time $t_2$ of a binary ONE oscillator 29 begins to operate and produces a positive-going output signal at terminal 98. At time $t_2'$ the strobe signal is removed, and the clamping action of strobed clamp circuit 26 is restored rapidly in the manner previously described. This action restores threshold circuit 28 and reestablishes the low impedance condition in the feedback circuit of gated oscillator 29. The oscillator is rapidly restored by the impedance decrease to its stable operating condition. Oscillation is terminated so rapidly that no more than one-half a cycle of operation is permitted to be completed because otherwise the full wave rectification of the circuits including diodes 96 and 97 would permit two positive-going output pulses to appear at output terminal 98 in response to each input pulse on input lead 81.

Wave shaping circuit 30 receives the output from gated oscillator 29 by application of output signals through a resistor 99 from terminal 98 to the base electrode of a transistor 100. Circuit 30 is actually a monopulser, and transistor 100 is the input stage thereof which is normally nonconducting in the absence of input signals. The other transistor in the monopulser is a transistor 101 which has its base electrode coupled through a capacitor 102 to the collector electrode of transistor 100. A positive potential source 103 supplies positive bias to the base electrode of transistor 101 through a resistor 106 thereby normally biasing transistor 101 for conduction. Collector current to transistor 101 is supplied primarily through a resistor 107 which is connected between the collector electrode and source 103. However, additional collector current is supplied through a resistor 108 and a diode 109 from source 103. The conduction in transistor 101 normally holds the collector electrode thereof very slightly above ground potential so that the anode of diode 109 is also approximately at ground potential. Consequently, an additional diode 110 which connects resistor 108 to the base electrode of transistor 100 is normally biased nonconducting, as is transistor 100 which has its base electrode connected to ground through a resistor 111.

The occurrence of a positive pulse at terminal 98 in the gated oscillator 29 drives a current to ground through resistor 99 and through the resistor 111. This action develops a positive potential across resistor 111 which forward biases the base-emitter junction of transistor 100 thereby driving transistor 100 into conduction. The resulting current drawn from source 103 through the collector resistor 112 of transistor 100 produces a negative-going potential at the collector electrode of transistor 100. This potential is coupled through capacitor 102 to the base electrode of transistor 101 and biases that transistor nonconducting. A positive-going potential at the collector electrode of transistor 101 at this time reversely biases diode 109 and permits current to flow from source 103 through resistor 108, diode 110 and resistor 111 to ground, thereby establishing a forward bias for transistor 100 independently of output signals from gated oscillator 29.

As soon as capacitor 102 charges through resistor 106 and transistor 100, transistor 101 is once again biased into conduction. The resulting negative-going potential at the collector electrode of transistor 101 forward biases diode 109 once more thereby providing a conduction path through that diode and the collector-emitter circuit of transistor 101 to shunt base current away from transistor 100 and thereby restore the monopulser to its normal quiescent condition. The action just described causes a positive pulse to be produced between output terminals 31 and 32 in response to each positive pulse at terminal 98 in gated oscillator 29. These positive pulses occur, as has been previously described, in response to the reception of a binary ONE signal in the discriminator from the magnetic memory 12 in FIG. 1.

Although the present invention has been described in connection with a particular embodiment thereof, it is to be understood that additional embodiments and modifications thereof which will be obvious to those skilled in the art are included within the spirit and scope of the invention.

What is claimed is:

1. In a magnetic memory system which is adapted on appropriate addressing to produce binary ONE and ZERO signals of different configuration in a sensing circuit included in said memory system, each such signal extending over a predetermined bit interval of time, an amplifier, a source of clock pulse signals controlling the operation of said memory system, a resistor and a capacitor connected in a series circuit in the output of said amplifier, a normally-conducting clamp circuit connected in series with said resistor and capacitor for connecting said series circuit across the output of said amplifier when said clamp is conducting, means applying said clock pulse signals to bias said clamp nonconducting at a time $t_1$ after the start of each of said bit intervals and for a predetermined time after said time $t_1$, detector means connected across said clamp and adapted to be actuated at a time $t_2$ by said clock pulses when said clamp is nonconducting, and the impedances of said resistor and capacitor being proportioned to have a time constant such that the charge voltage accumulated on said capacitor at time $t_1$ is substantially equal to the magnitude of a binary ZERO signal at said time $t_2$.

2. A binary signal discriminating circuit comprising input connections for receiving binary ONE and binary ZERO signals of different configurations, a resistor, a capacitor, and a clamp circuit connected in series circuit across said connections, an amplitude discriminator having the input thereof connected across said clamp circuit, the input resistance of said discriminator being much higher than the resistance of said resistor, said discriminator being adapted to be normally inoperative in the absence of a strobe pulse, means applying a signal to disable said clamp circuit, means applying a strobe pulse to enable said discriminator while said clamp circuit is disabled, and said resistor and capacitor having a time constant adapted so that the signal voltage charge accumulated on said capacitor just prior to the application of said disabling signal is substantially equal in magnitude to the magnitude of said binary ZERO signal at the time of said strobe pulse.

3. A binary signal discriminating circuit comprising input connections for receiving binary ONE and ZERO signals, each of said signals occurring in an interval of predetermined duration, said signals having substantially the same configuration in an initial part of said interval and thereafter having substantially divergent configurations in a second part of said interval, a signal amplitude discriminator having an input thereof coupled to said connections, said discriminator comprising means clamping said discriminator to an inoperative state except during a predetermined portion of said second part of said interval, means shunting said binary signals away from the input of said discriminator during said first part of said interval, a capacitor connected in series between said input connections and said discriminator, said capacitor being adapted with respect to said shunting means to accumulate a charge voltage during said first part of said interval which is thereafter applied in series-bucking relationship to said signals in said second part of said interval, and means disabling said shunting means during said second part of said interval.

4. A binary signal discriminating circuit comprising input connections for receiving binary ONE and ZERO signals, each of said signals occurring in an interval of predetermined duration, said signals having substantially the same configuration in an initial part of said interval and thereafter having substantially divergent configurations in a second part of said interval, a signal amplitude discriminator having an input thereof coupled to said connections, a resistor and a capacitor connected in series between said connections and said discriminator, said input connections have connected thereacross input resistance which is much smaller than the resistance of said resistor which has in turn a resistance that is much smaller than the input resistance of said discriminator, means shunting said binary signals away from the input of said discriminator during said first part of said interval, said shunting means including a clamping circuit connected to shunt the input of said discriminator, and means disabling said shunting means during said second part of said interval.

5. A binary signal discriminating circuit comprising input connections for receiving bipolar binary ONE and ZERO signals, each of said signals occurring in an interval of predetermined duration, means indicating the reception of signals in excess of a predetermined magnitude of either polarity, an electric circuit connection between said input connections and said indicating means, said electric connection including only elements with symmetrical conduction characteristics, a capacitor and a first resistor connected in series in said electric circuit connection adjacent to said input connections, a second resistor connected in said electric circuit connection adjacent to said indicating means and having a much larger resistance than said first resistor, a bipolar clamp coupled to said electric circuit connection between said capacitor and said second resistor for shunting said electric circuit connection to ground, and means disabling said clamp during a predetermined part of each of said intervals.

6. The binary signal discriminating circuit in accordance with claim 5 in which said indicating means includes a second bipolar clamp circuit connected to shunt said electric circuit connection to ground, and means disabling said second clamp to enable said indicating means at a predetermined time in said interval while the first-mentioned clamp is also disabled.

7. The binary signal discriminating circuit in accordance with claim 5 in which said indicating means comprises a normally-quiescent impedance-gated oscillator, and said oscillator includes shunt-connected means responsive to a predetermined amplitude of said bipolar signals on said electric circuit connection to change the impedance in said oscillator and thereby drive said oscillator into oscillation.

8. In a magnetic memory system current driver means, an array of bistable magnetic devices, a sensing circuit electromagnetically linked to said devices, electric circuit means electromagnetically coupling said driver means to said devices for producing in said sensing circuit binary ONE and ZERO signals of different configurations, each of said signals extending over a bit interval of predetermined duration, an amplifier, means coupling said sensing circuit to the input of said amplifier, a source of clock pulses controlling the operation of said memory system, a resistor and a capacitor connected in a series circuit in the output of said amplifier, a normally conducting clamp circuit connected in series with said resistor and capacitor for connecting said series circuit across the output of said amplifier when said clamp is conducting, means applying said clock pulse signals to bias said clamp nonconducting at a time $t_1$ after the start of each of said bit intervals and for a predetermined time after said time $t_1$, detector means connected across said clamp and adapted to be actuated at a time $t_2$ by said clock pulses when said clamp is nonconducting, and the impedances of said resistor and capacitor being proportioned to have a time constant such that the charge voltage accumulated on said capacitor at time $t_1$ is substantially equal to the magnitude of a binary ZERO signal at said time $t_2$.

9. The magnetic memory system in accordance with claim 8 in which said current driver means includes means stabilizing the output current magnitude of such means and also stabilizing the rise time thereof thereby producing said binary ONE and ZERO signals in substantially constant phase with respect to said times $t_1$ and $t_2$.

10. The magnetic memory system in accordance with claim 8 in which said means coupling said sensing circuit to said amplifier comprises two transformers each having primary and secondary windings, each of said primary windings being connected in series in a different part of said sensing circuit, and means connecting said secondary windings in series with one another across the input of said amplifier to equalize said signals for amplitude and delay distortion in said sensing circuit thereby coupling to said amplifier binary signals with substantially uniform ONE and ZERO magnitudes, respectively.

11. The magnetic memory circuit in accordance with claim 9 in which said means coupling said sensing circuit to said amplifier comprises two transformers each having primary and secondary windings, each of said primary windings being connected in series in a different part of said sensing circuit, and means connecting said secondary windings in series with one another across the input of said amplifier to equalize said signals for amplitude and delay distortion in said sensing circuit thereby coupling to said amplifier binary signals with substantially uniform ONE and ZERO magnitudes, respectively.

References Cited by the Examiner

UNITED STATES PATENTS

| | | | |
|---|---|---|---|
| 2,935,608 | 5/1960 | Mirzwinski | 328—165 |
| 3,058,113 | 10/1962 | Wilson | 328—165 |
| 3,159,751 | 12/1964 | Bogdan et al. | 307—88.5 |
| 3,253,155 | 5/1966 | Randall | 328—151 X |

ARTHUR GAUSS, *Primary Examiner.*

J. JORDAN, *Assistant Examiner.*